(12) United States Patent
Nakhjavani et al.

(10) Patent No.: US 11,046,453 B2
(45) Date of Patent: Jun. 29, 2021

(54) DETECTING A FUEL JETTISON EVENT

(71) Applicant: The Boeing Company, Chicago, IL (US)

(72) Inventors: Omid B. Nakhjavani, Kirkland, WA (US); Mark A. Mazarek, Bothell, WA (US); Changzhou Wang, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 328 days.

(21) Appl. No.: 16/281,479

(22) Filed: Feb. 21, 2019

(65) Prior Publication Data

US 2020/0269992 A1    Aug. 27, 2020

(51) Int. Cl.
*B64D 45/00* (2006.01)
*B64D 37/26* (2006.01)

(52) U.S. Cl.
CPC ............ *B64D 45/00* (2013.01); *B64D 37/26* (2013.01); *B64D 2045/0085* (2013.01)

(58) Field of Classification Search
CPC .................. B64D 45/00; B64D 37/26; B64D 2045/0085; Y02T 50/40
See application file for complete search history.

*Primary Examiner* — Genna M Mott
(74) *Attorney, Agent, or Firm* — Kunzler Bean & Adamson

(57) ABSTRACT

Disclosed herein is a method that comprises detecting that a rate of decrease in fuel quantity for an aircraft exceeds a previously-determined baseline rate of decrease in fuel quantity for the aircraft by a threshold rate during a corresponding segment of flight of the aircraft. The method also comprises determining that a fuel jettison setting for the aircraft is enabled in response to the detected increase in the rate of decrease in fuel quantity. The method further comprises determining that an angle of one or more flaps of the aircraft satisfies a threshold angle. The method additionally comprises generating an alert indicating possible fuel contamination of the one or more flaps due to jettisoned fuel.

20 Claims, 5 Drawing Sheets

DETECTING A FUEL JETTISON EVENT

FIELD

This disclosure relates generally to aircraft, and more particularly to detecting a fuel jettison event during an aircraft's flight.

BACKGROUND

Aircraft may jettison or discharge fuel during flight. The jettisoned fuel may contaminate parts of the aircraft when it is jettisoned. The fuel jettison event may not be reported to the service department such that the service department is unaware of the need to clean or remedy the parts of the aircraft that are contaminated with fuel.

SUMMARY

The subject matter of the present application has been developed in response to the present state of the art, and in particular, in response to the problems and disadvantages associated with conventional methods for determining whether an aircraft has jettisoned fuel. Accordingly, the subject matter of the present application has been developed to detect a fuel jettison event for an aircraft that overcomes at least some of the above-discussed shortcomings of prior art techniques.

Disclosed herein is a method that comprises detecting that a rate of decrease in fuel quantity for an aircraft exceeds a previously-determined baseline rate of decrease in fuel quantity for the aircraft by a threshold rate during a corresponding segment of flight of the aircraft. The method also comprises determining that a fuel jettison setting for the aircraft is enabled in response to the detected increase in the rate of decrease in fuel quantity. The method further comprises determining that an angle of one or more flaps of the aircraft satisfies a threshold angle. The method additionally comprises generating an alert indicating possible fuel contamination of the one or more flaps due to jettisoned fuel. The preceding subject matter of this paragraph characterizes example 1 of the present disclosure.

The method further comprises determining the baseline rate of decrease in fuel quantity based on historical fuel quantity data associated with the aircraft and flight of the aircraft. The preceding subject matter of this paragraph characterizes example 2 of the present disclosure, wherein example 2 also includes the subject matter according to example 1, above.

The method further comprises tracking the real-time fuel quantity for the aircraft over time during the aircraft's flight. The method also comprises calculating a slope of a first curve for the fuel quantity for the aircraft and the rate of decrease in the fuel quantity for the aircraft based on the calculated slope. The method additionally comprises calculating a slope of a second curve for the historical fuel quantity data and the baseline rate of decrease in fuel quantity for the aircraft based on the calculated slope. The method further comprises comparing the calculated rate of decrease in the fuel quantity for the aircraft to the determined baseline rate of decrease in fuel quantity for the historical data to determine whether a difference in the rates of decrease in the fuel quantities satisfies the threshold rate. The preceding subject matter of this paragraph characterizes example 3 of the present disclosure, wherein example 3 also includes the subject matter according to example 2, above.

The method further comprises detecting a change in the slope of the first curve for the fuel quantity of the aircraft that satisfies a slope change threshold. The method also comprises, in response to the slope of the first curve satisfying the slope change threshold, periodically calculating the slope of the first curve at different intervals until the slope of the first curve is substantially similar to the slope of the first curve prior to the detected change in the slope. The method additionally comprises averaging the slope of the first curve for the different intervals, the average slope indicating the rate of decrease in the fuel quantity for the aircraft. The preceding subject matter of this paragraph characterizes example 4 of the present disclosure, wherein example 4 also includes the subject matter according to example 3, above.

The method further comprises ignoring the detected change in the fuel quantity of the aircraft in response to the detected change in the slope of the first curve for the fuel quantity of the aircraft not satisfying the slope change threshold. The preceding subject matter of this paragraph characterizes example 5 of the present disclosure, wherein example 5 also includes the subject matter according to example 4, above.

The fuel jettison setting for the aircraft is an automatic fuel jettison setting such that when the automatic fuel jettison setting is enabled, fuel is automatically jettisoned from the aircraft based on one or more conditions associated with the aircraft. The preceding subject matter of this paragraph characterizes example 6 of the present disclosure, wherein example 6 also includes the subject matter according to any one of examples 1-5, above.

The method further comprises monitoring and tracking the angle of the one or more flaps during the aircraft's flight. The preceding subject matter of this paragraph characterizes example 7 of the present disclosure, wherein example 7 also includes the subject matter according to any one of examples 1-6, above.

The method further comprises generating a report in response to the alert that includes information related to the possible fuel contamination of the one or more flaps, the report comprising one or more of an amount of fuel that may have contaminated the one or more flaps, the angle that the one or more flaps were set, the altitude of the aircraft when the fuel may have contaminated the flaps, the speed of the aircraft when the fuel may have contaminated the flaps, and an estimated amount of time that the fuel may have contaminated the flaps. The preceding subject matter of this paragraph characterizes example 8 of the present disclosure, wherein example 8 also includes the subject matter according to any one of examples 1-7, above.

The threshold angle for the one or more flaps is at least 20 degrees. The preceding subject matter of this paragraph characterizes example 9 of the present disclosure, wherein example 9 also includes the subject matter according to any one of examples 1-8, above.

The threshold angle for the one or more flaps is at least 30 degrees. The preceding subject matter of this paragraph characterizes example 10 of the present disclosure, wherein example 10 also includes the subject matter according to example 9, above.

Further disclosed herein is an apparatus comprising a processor. The apparatus also comprises a memory that stores code executable by the processor to detect that a rate of decrease in fuel quantity for an aircraft exceeds a previously-determined baseline rate of decrease in fuel quantity for the aircraft by a threshold rate during a corresponding segment of the aircraft's flight, determine that a fuel jettison setting for the aircraft is enabled in response to the detected increase in the rate of decrease in fuel quantity, determine that an angle of one or more flaps of the aircraft satisfies a threshold angle, and generate an alert indicating possible fuel contamination of the one or more flaps due to jettisoned fuel. The preceding subject matter of this paragraph characterizes example 11 of the present disclosure.

The code is further executable by the processor to determine the baseline rate of decrease in fuel quantity based on historical fuel quantity data associated with the aircraft and the aircraft's flight. The preceding subject matter of this paragraph characterizes example 12 of the present disclosure, wherein example 12 also includes the subject matter according to example 11, above.

The code is further executable by the processor to track the real-time fuel quantity for the aircraft over time during the aircraft's flight, calculate a slope of a first curve for the fuel quantity for the aircraft and the rate of decrease in the fuel quantity for the aircraft based on the calculated slope, calculate a slope of a second curve for the historical fuel quantity data and the baseline rate of decrease in fuel quantity for the aircraft based on the calculated slope, and compare the calculated rate of decrease in the fuel quantity for the aircraft to the determined baseline rate of decrease in fuel quantity for the historical data to determine whether a difference in the rates of decrease in the fuel quantities satisfies the threshold rate. The preceding subject matter of this paragraph characterizes example 13 of the present disclosure, wherein example 13 also includes the subject matter according to example 12, above.

The code is further executable by the processor to detect a change in the slope of the first curve for the fuel quantity of the aircraft that satisfies a slope change threshold, in response to the slope of the first curve satisfying the slope change threshold, periodically calculate the slope of the first curve at different intervals until the slope of the first curve is substantially similar to the slope of the first curve prior to the detected change in the slope, and average the slope of the first curve for the different intervals, the average slope indicating the rate of decrease in the fuel quantity for the aircraft. The preceding subject matter of this paragraph characterizes example 14 of the present disclosure, wherein example 14 also includes the subject matter according to example 13, above.

The code is further executable by the processor to ignore the detected change in the fuel quantity of the aircraft in response to the detected change in the slope of the first curve for the fuel quantity of the aircraft not satisfying the slope change threshold. The preceding subject matter of this paragraph characterizes example 15 of the present disclosure, wherein example 15 also includes the subject matter according to example 14, above.

The fuel jettison setting for the aircraft is an automatic fuel jettison setting such that when the automatic fuel jettison setting is enabled, fuel is automatically jettisoned from the aircraft based on one or more conditions associated with the aircraft. The preceding subject matter of this paragraph characterizes example 16 of the present disclosure, wherein example 16 also includes the subject matter according to any one of examples 11-15, above.

The code is further executable by the processor to monitor and track the angle of the one or more flaps during the aircraft's flight. The preceding subject matter of this paragraph characterizes example 17 of the present disclosure, wherein example 17 also includes the subject matter according to any one of examples 11-16, above.

The code is further executable by the processor to generate a report in response to the alert that includes information related to the possible fuel contamination of the one or more flaps, the report comprising one or more of an amount of fuel that may have contaminated the one or more flaps, the angle that the one or more flaps were set, the altitude of the aircraft when the fuel may have contaminated the flaps, the speed of the aircraft when the fuel may have contaminated the flaps, and an estimated amount of time that the fuel may have contaminated the flaps. The preceding subject matter of this paragraph characterizes example 18 of the present disclosure, wherein example 18 also includes the subject matter according to any one of examples 11-17, above.

The threshold angle for the one or more flaps is at least 20 degrees. The preceding subject matter of this paragraph characterizes example 19 of the present disclosure, wherein example 19 also includes the subject matter according to any one of examples 11-18, above.

Also disclosed herein is a program product comprising a computer readable storage medium that stores code executable by a processor. The executable code comprises code to detect that a rate of decrease in fuel quantity for an aircraft exceeds a previously-determined baseline rate of decrease in fuel quantity for the aircraft by a threshold rate during a corresponding segment of the aircraft's flight, determine that a fuel jettison setting for the aircraft is enabled in response to the detected increase in the rate of decrease in fuel quantity, determine that an angle of one or more flaps of the aircraft satisfies a threshold angle, generate an alert indicating possible fuel contamination of the one or more flaps due to jettisoned fuel. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
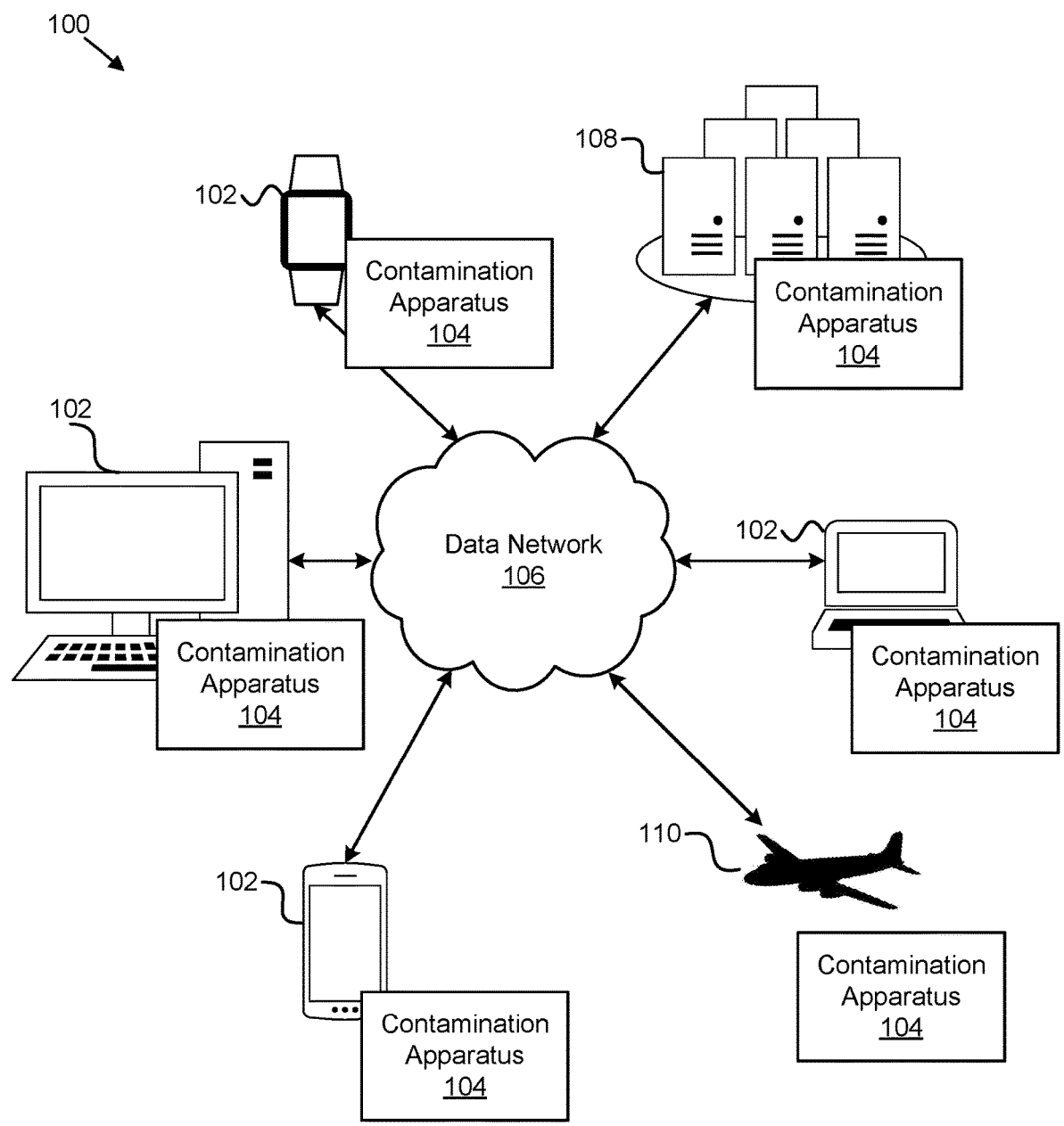
FIG. 1 is a schematic block diagram of a system for detecting a fuel jettison event, according to one or more examples of the present disclosure.

FIG. 1 is a schematic block diagram illustrating one embodiment of a system 100 for detecting a fuel jettison event. The system 100 includes one or more information handling devices 102, one or more contamination apparatuses 104, one or more data networks 106, one or more servers 108, and one or more aircraft 110. Even though a specific number of information handling devices 102, contamination apparatuses 104, data networks 106, one or more servers 108, and aircraft 110 are depicted in FIG. 1, one of skill in the art will recognize, in light of this disclosure, that any number of information handling devices 102, contamination apparatuses 104, data networks 106, one or more servers 108, and aircraft 110 may be included in the system 100.

The information handling devices 102 of the system 100 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102, one or more servers 108, and/or one or more aircraft 110 over the data network 106, described below. The information handling devices 102 may include processors, processor cores, and/or the like that are configured to execute various programs, program code, applications, instructions, functions, and/or the like for analyzing, processing, searching, mapping, and/or the like data sets such as extremely large data sets (e.g., Big Data). The data sets may be stored in a database, a data store, a repository, and/or the like stored locally on the aircraft 110, in the cloud, and/or some combination of both.

In one embodiment, the contamination apparatus 104 is configured to predict, detect, determine, or the like a fuel jettison event for an aircraft 110 during the aircraft's flight, and generate, create, or otherwise produce an alert indicating possible fuel contamination of one or more flaps (or other parts) for the aircraft 110 due to the fuel jettison event. In particular, the contamination apparatus 104 detects that a rate of decrease in fuel quantity for an aircraft 110 exceeds a previously-determined baseline rate of decrease in fuel quantity for the aircraft 110 by a threshold rate during a corresponding segment of the aircraft's flight, determines that a fuel jettison setting for the aircraft 110 is enabled in response to the detected increase in the rate of decrease in fuel quantity, determines that an angle of one or more flaps of the aircraft 110 satisfies a threshold angle, and generates an alert indicating possible fuel contamination of the one or more flaps due to jettisoned fuel.

In one embodiment, the contamination apparatus 104 provides a solution to drawbacks in conventional methods for detecting fuel jettison events by accurately predicting or detecting whether and/or when a fuel jettison event occurred or is occurring based on an analysis of other aircraft measurements or factors. As used herein, fuel jettison refers to releasing or dumping fuel during flight, which may be performed to reduce the aircraft's weight before landing, e.g., in an emergency situation.

The contamination apparatus 104 may track and monitor the fuel quantity on the aircraft 110, calculate the usage or burn rate for the fuel, and determine whether the calculated fuel usage rate exceeds a baseline, standard, default, or the like fuel usage rate for the corresponding portion of the aircraft's flight. In response to detecting the increase in the fuel quantity usage rate (or the increase in the rate of decrease of the fuel quantity), the contamination apparatus 104 also checks a fuel jettison setting (e.g., an auto fuel jettison setting) to see if it is enabled. If so, then the contamination apparatus 104 may determine that fuel is currently being jettisoned from the aircraft 110. Such an analysis is helpful in the absence of fuel jettison sensors (or the malfunction of fuel jettison sensors), the absence of pilots' reports that fuel was jettisoned at a certain point during the flight, and so on.

Furthermore, the contamination apparatus 104 determines whether parts of the aircraft 110 have been contaminated by the fuel jettisoned from the aircraft 110. For instance, in some examples, the contamination apparatus 104 determines the angle that the flaps are set during the detected fuel jettison event, and, based on the determined angle, determine whether the flaps have been contaminated by the fuel that is jettisoned from the aircraft 110. If the angle that the flaps are set satisfies a threshold angle, then the contamination apparatus 104 generates an alert, report, signal, or the like that the flaps may have been contaminated with jettisoned fuel. In some examples, the alert or report notifies ground service and maintenance crews that the flaps, or other parts of the aircraft 110, may have been contaminated with jettisoned fuel.

In various examples, the contamination apparatus 104 is embodied as a hardware appliance that can be installed or deployed on an information handling device 102, on a server 108, on an aircraft 110, or elsewhere on the data network 106. In certain examples, the contamination apparatus 104 includes a hardware device such as a secure hardware dongle or other hardware appliance device (e.g., a set-top box, a network appliance, or the like) that attaches to a device, a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the contamination apparatus 104 includes a power interface, a wired and/or wireless network interface, a graphical interface that attaches to a display, and/or a semiconductor integrated circuit device as described below, configured to perform the functions described herein with regard to the contamination apparatus 104.

The contamination apparatus 104 includes a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like, in some examples. In one embodiment, the contamination apparatus 104 is mounted on a printed circuit board with one or more electrical lines or connections (e.g., to volatile memory, a non-volatile storage medium, a network interface, a peripheral device, a graphical/display interface, or the like). The hardware appliance includes one or more pins, pads, or other electrical connections configured to send and receive data (e.g., in communication with one or more electrical lines of a printed circuit board or the like), and one or more hardware circuits and/or other electrical circuits configured to perform various functions of the contamination apparatus 104 in some examples.

The semiconductor integrated circuit device or other hardware appliance of the contamination apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the contamination apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 includes a wireless network, such as a wireless cellular network, a local wireless network, such as a Wi-Fi network, a Bluetooth® network, a near-field communication ("NFC") network, an ad hoc network, and/or the like, in certain examples. The data network 106 includes a wide area network ("WAN"), a storage area network ("SAN"), a local area network (LAN), an optical fiber network, the internet, or other digital communication network in certain examples. In some examples, the data network 106 includes two or more networks. In one example, the data network 106 includes one or more servers, routers, switches, and/or other networking equipment. In some examples, the data network 106 includes one or more computer readable storage media, such as a hard disk drive, an optical drive, non-volatile memory, RAM, or the like.

The wireless connection is a mobile telephone network in one example. The wireless connection employs a Wi-Fi network based on any one of the Institute of Electrical and Electronics Engineers ("IEEE") 802.11 standards in one example. Alternatively, the wireless connection is a Bluetooth® connection in certain examples. In addition, the wireless connection employs a Radio Frequency Identification ("RFID") communication including RFID standards established by the International Organization for Standardization ("ISO"), the International Electrotechnical Commission ("IEC"), the American Society for Testing and Materials® (ASTM®), the DASH7TM Alliance, and EPCGlobalTM in various examples.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, is embodied as blade servers, mainframe servers, tower servers, rack servers, and/or the like. The one or more servers 108 is configured as mail servers, web servers, application servers, FTP servers, media servers, data servers, web servers, file servers, virtual servers, and/or the like in some examples. The one or more servers 108 are communicatively coupled (e.g., networked) over a data network 106 to one or more information handling devices 102 in certain examples. The one or more servers 108 stores data in data structures such as databases, data repositories, or the like in some examples.

Figure 2:
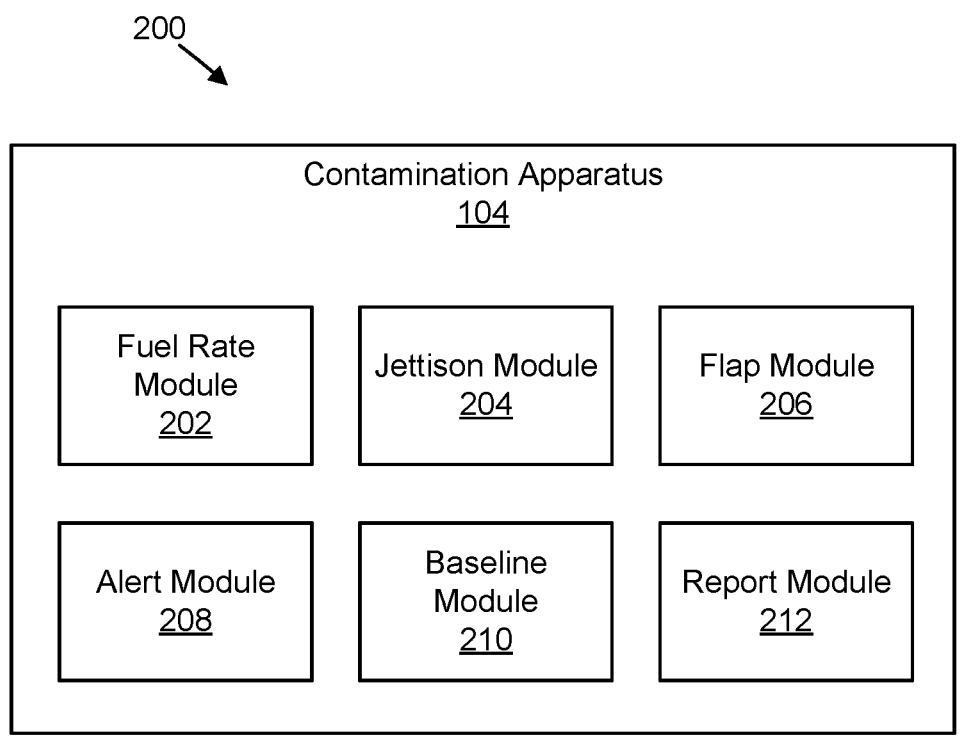
FIG. 2 is a schematic block diagram of an apparatus for detecting a fuel jettison event, according to one or more examples of the present disclosure.

FIG. 2 depicts one embodiment of an apparatus 200 for detecting a fuel jettison event. The apparatus 200 includes an embodiment of the contamination apparatus 104. The contamination apparatus 104, in certain implementations, includes one or more of a fuel rate module 202, a jettison module 204, a flap module 206, an alert module 208, a baseline module 210, and a report module 212, which are described in more detail below.

The fuel rate module 202, in one embodiment, is configured to detect that a rate of decrease in fuel quantity for an aircraft 110 exceeds a previously determined baseline rate of decrease in fuel quantity for the aircraft 110 by a threshold rate during a corresponding segment of the aircraft's flight.

As used herein, the rate of decrease in the fuel quantity of an aircraft 110 refers to the rate at which the aircraft's fuel is used, is burned, or is otherwise disposed of, e.g., during fuel jettison during the aircraft's flight.

The fuel rate module 202 may track, over time and during the aircraft's flight, the fuel quantity for the aircraft 110. For instance, the fuel rate module 202 may poll a fuel quantity or fuel level sensor that is configured to monitor, detect, track, report, or the like the fuel quantity or fuel level of the aircraft 110 at periodic intervals, continuously, and/or otherwise in real-time. In another embodiment, the fuel rate module 202 may receive fuel quantity or fuel level readings from the fuel level sensor at periodic intervals, continuously, and/or otherwise in real-time.

The fuel rate module 202 may collect, store, or the like fuel quantity information from the fuel level sensor on an onboard memory device (e.g., on the aircraft 110), on a cloud or internet storage device, on a mobile storage device on the aircraft 110, or the like. In one embodiment, the fuel rate module 202 generates a curve or graph of the fuel quantity of the aircraft 110 using the fuel quantity information received at the periodic intervals during the aircraft's flight. The fuel rate module 202 may calculate the rate of decrease in fuel quantity (e.g., the rate of fuel usage or burn rate) for the aircraft 110 by (1) calculating and generating a curve of the first derivative of the generated curve of the fuel quantity of the aircraft 110 to determine the slope of the curve of the fuel quantity at the periodic intervals, and (2) calculating and generating a curve of the second derivative of the generated curve of the slope of the curve of the fuel quantity at the periodic intervals. The second derivative of the original curve of the fuel quantity usage over time provides the rate of change, e.g., the rate of decrease of the fuel quantity of the aircraft 110 over time.

The fuel rate module 202 may compare the current curve of the rate of decrease in the fuel quantity of the aircraft 110 (e.g., the curve of the second derivative of the curve of the fuel quantity of the aircraft 110), in real-time, to a baseline rate of decrease in fuel quantity for the aircraft 110 during a corresponding segment of the aircraft's flight to determine whether the rate of decrease of the fuel quantity satisfies, exceeds, or the like the baseline rate of decrease by a threshold rate. As explained in more detail below, the baseline rate of decrease may comprise a rate of fuel quantity decrease that is based on historical fuel quantity or fuel usage data for a corresponding flight, flight path, aircraft 110, and/or the like. The threshold rate of decrease of fuel quantity may be predefined or predetermined such that the threshold rate is large enough to indicate a change in the fuel quantity that is attributable to a fuel jettison event and not to simple maneuvering actions such as turning or other factors such as turbulence.

The jettison module 204, in one embodiment, is configured to determine that a fuel jettison setting for the aircraft 110 is enabled in response to the detected increase in the rate of decrease in the fuel quantity of the aircraft 110. In some embodiment, the fuel jettison setting may include an automatic fuel jettison setting such that when certain conditions are met on the aircraft 110, during the aircraft's flight, or the like, fuel is automatically jettisoned from the aircraft 110. The conditions may include whether the aircraft 110 needs to reduce its weight to prepare for landing, if there is an emergency condition and the aircraft 110 needs to land immediately and therefore needs to reduce its weight to prepare for landing, or the like.

In one embodiment, the jettison module 204 monitors for and receives a signal from the jettison setting for the aircraft 110 in response to the jettison setting being set or unset, enabled or disabled, or the like. For example, in response to a pilot for the aircraft 110 enabling or disabling the auto jettison setting of the aircraft 110, the jettison module 204 may receive a signal, message, notification, alert, or the like that indicates that the auto-jettison setting is set or unset. In some embodiments, the jettison module 204 may periodically check the jettison setting for the aircraft 110 to see if it is enabled or disabled, may check the jettison setting in response to the detected increase in the rate of decrease in the fuel quantity of the aircraft 110, may periodically check a flag that is set or unset in response to the jettison setting being enabled or disabled, and/or the like.

The flap module 206, in one embodiment, is configured to determine an angle that the aircraft's flaps are set at in response to the detected increase in the rate of decrease in fuel quantity and/or in response to determining that the jettison setting for the aircraft 110 is set. As used herein, an aircraft's flaps are a type of high-lift device used to increase the lift of an aircraft wing at a given airspeed. Flaps are usually mounted on the wing trailing edges of a fixed-wing aircraft. Flaps are used for extra lift on takeoff. Flaps also cause an increase in drag in mid-flight, so they are retracted when not needed. Flaps can also increase the wing drag, which can be beneficial during approach and landing because it slows the aircraft.

When the flaps are deployed, they may be set at different positions that are each associated with a given angle. The angle may be determined based on an axis or plane associated with the starting or retracted position for the flaps. For instance, when the flaps are deployed, they may be set at a 20 degree angle relative to the flaps' retracted position prior to being deployed. The determined angle may be the absolute value of the angle relative to the flaps' retracted position prior to being deployed. For instance, if the flaps are deployed at a negative 20 degrees relative to the flaps' retracted position prior to being deployed, the determined angle may be 20 degrees.

In one embodiment, the flap module 206 determines or receives the angle of the flaps in response to the flaps being deployed. In further embodiments, the flap module 206 continuously, constantly, randomly, or the like monitors and tracks the angle at which the flaps are deployed, periodically checks the flap position to determine the angle at which the flaps are deployed, or the like. In one embodiment, the flap module 206 checks an angle value or setting for the flaps that is stored on the aircraft 110 computing system to determine the angle that the flaps are set to when they are deployed.

In one embodiment, the flap module 206 determines whether the flaps are set at an angle that satisfies, exceeds, or the like a threshold angle related to a fuel jettison event for the aircraft 110. As explained above, when fuel is jettisoned from the aircraft 110, the fuel may contaminate or get on the flaps depending on the angle at which the flaps are set. If the angle satisfies, exceeds, or is equal to a threshold angle while the rate of decrease of fuel quantity increases and the fuel jettison setting is enabled, then the flap module 206 determines that the flaps may be contaminated with fuel that is being jettisoned from the aircraft 110. In some embodiments, the threshold angle is at least 20 degrees, at least 30 degrees, or the like.

In one embodiment, the alert module 208 is configured to generate an alert, signal, notification, message, or the like that indicates that the flaps, or other parts of the aircraft 110 may have been contaminated with fuel due to fuel being jettisoned from the aircraft 110. The alert may comprise an audio or visual alert, e.g., on a screen or as a light indicator that is provided to the pilots during the flight. In certain embodiments, the alert is not provided to the pilots, but is instead provided to maintenance crews on the ground to make the maintenance crew aware of the possible fuel contamination of the flaps.

The baseline module 210, in one embodiment, is configured to determine the baseline rate of decrease in the fuel quantity of the aircraft 110, and the aircraft's corresponding flight, based on historical fuel quantity usage data associated with the aircraft 110 and the aircraft's flight. For example, the baseline module 210 may take fuel quantity data from the previous 10, 20, 50, 100, or the like flights that the aircraft 110 has taken that correspond to the current flight for the aircraft 110.

Using the historical fuel quantity data, the baseline module 210 may aggregate the data, e.g., taking averages of the data at each interval that the data is sampled, and generates a curve of the historical fuel quantity data. The baseline module 210 may then generate a curve of the first derivative of the fuel quantity data to determine the slope of the fuel quantity data over time and then take the second derivative of the slope curve to determine the rate of change of the fuel quantity, e.g., the rate of usage or decrease of the fuel quantity.

The fuel rate module 202, in certain embodiments, compares the current rate of decrease of fuel quantity to the baseline rate of decrease of fuel quantity for the corresponding segment of the flight for the aircraft 110 to determine whether the difference between the current rate of decrease of fuel quantity and the baseline rate of decrease of fuel quantity exceeds or satisfies the threshold rate of decrease of fuel quantity.

In one embodiment, in order to account for "noisy" fuel quantity data (e.g., noise generated by turbulence, maneuvering actions, or the like), either in the current fuel quantity data for a current flight or in the historical fuel quantity data, the fuel rate module 202 may detect a change in the slope of the fuel quantity data curve that satisfies a slope change threshold (e.g., a threshold slope value that is large enough to indicate a change in the fuel quantity that may be due to fuel being jettisoned from the aircraft 110).

In response to the slope of the fuel quantity data curve satisfying the slope change threshold, the fuel rate module 202 may periodically calculate the slope of the of the fuel quantity data curve at different intervals until the slope of the fuel quantity data curve is substantially similar to the slope of the fuel quantity data curve prior to the detected change in the slope, which may indicate that the fuel jettison event is finished. The fuel rate module 202 may then average the slope of the fuel quantity data curve for the different intervals such that the derivative of the average slope indicates the rate of decrease in the fuel quantity for the aircraft 110. In this manner, the fuel rate data module 202 can filter out or account for noisy fuel quantity data due to turbulence, maneuvering procedures, or other aircraft 110 variables that may affect the fuel level sensor's readings of the fuel quantity for the aircraft, but which may not be directly attributable to fuel being jettisoned from the aircraft 110.

In certain embodiments, the fuel rate module 202 ignores the detected change in the fuel quantity of the aircraft 110 in response to the detected change in the slope of the fuel quantity data curve for the fuel quantity of the aircraft 110 not satisfying the slope change threshold. In this manner, if the aircraft 110 experiences external factors such as turbulence or performing a maneuvering action, the fuel rate module 202 ignores the change in the fuel quantity level due to the external factor because the change in the slope of the fuel quantity data curve does not satisfy the slope change threshold, and therefore does not indicate a fuel jettison event.

In one embodiment, the report module 212 is configured to generate a report in response to the alert that the alert module 208 generates. The report includes information related to the possible fuel contamination of the one or more flaps that maintenance or ground crews can use to assess and correct the possible contamination. The information may include, for example, an amount of fuel that may have contaminated the one or more flaps, the angle that the one or more flaps were set, the altitude of the aircraft when the fuel may have contaminated the flaps, the speed of the aircraft when the fuel may have contaminated the flaps, and an estimated amount of time that the fuel may have contaminated the flaps. Thus, the report module 212 may communicate with various systems, sensors, storage devices, application programming interfaces ("APIs"), or the like of the aircraft computing system to acquire the data that is needed to generate the report.

Figure 3:
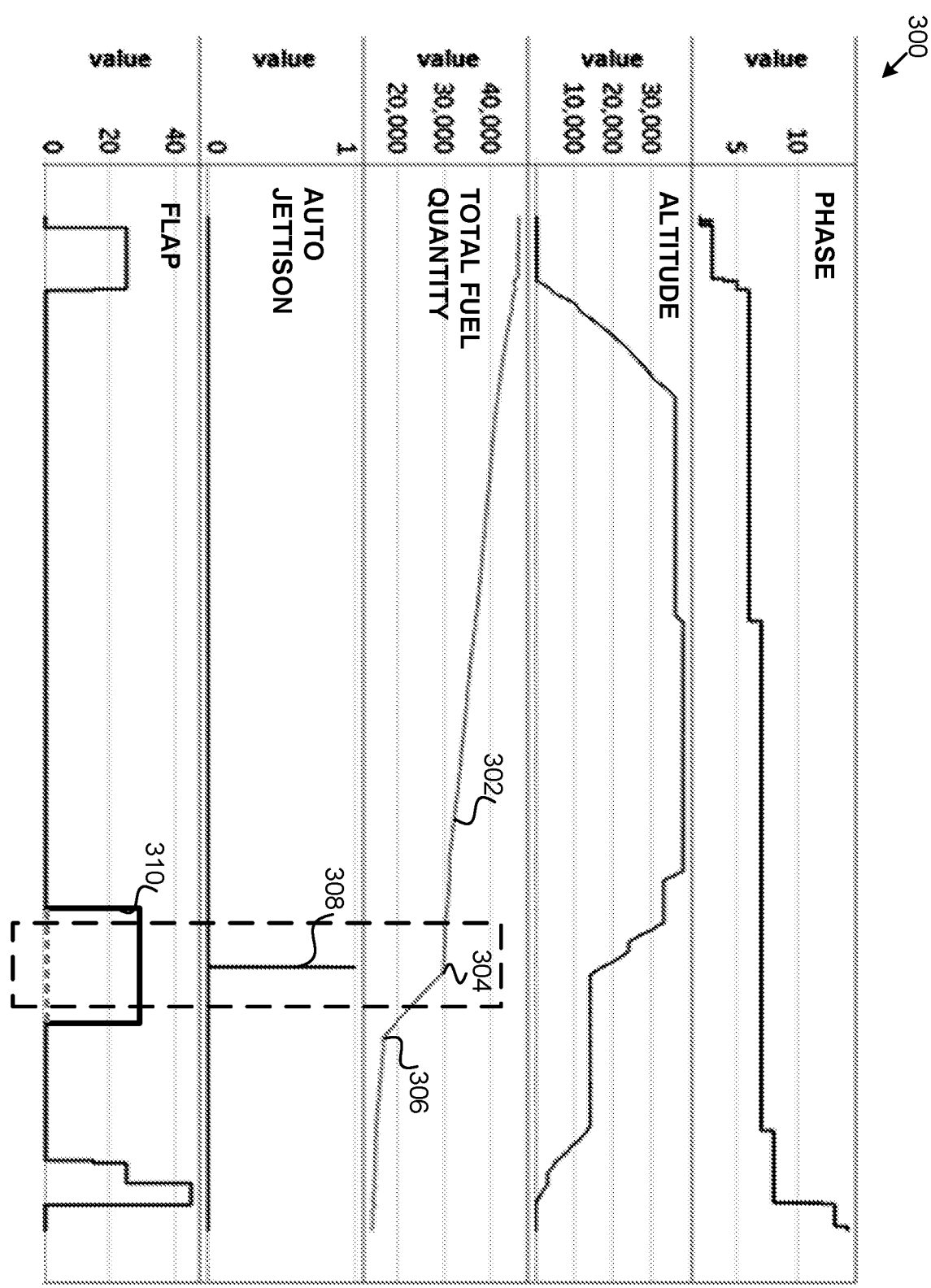
FIG. 3 illustrates one embodiment of example data curves that may be used for detecting a fuel jettison event, according to one or more examples of the present disclosure.

FIG. 3 illustrates one embodiment of example data curves 300 that may be used for detecting a fuel jettison event. In one embodiment, various data points may be monitored, tracked, collected, or the like during the course of a flight such as the phase, the altitude, the total fuel quantity, the auto jettison setting, the flap angle, and/or the like. During the flight, in one embodiment, the fuel rate module 202 may track and generate a curve of the total fuel quantity over time 302. The fuel rate module 202 may detect a change in the slope of the curve 304 and may take the second derivative of the fuel quantity curve 302 to determine the rate of the decrease of the fuel quantity during the period from where the slope changes 304 to a point 306 where the slope returns to a value that is similar to the slope prior to the slope change.

At the point where the rate of decrease in the fuel quantity increases, the jettison module 204 checks the auto-jettison setting to see if it is enabled, which in this example it is (as evidenced by the auto-jettison signal being set to "1"). Furthermore, the flap module 206 checks the angle of the flaps to determine if the angle satisfies or exceeds a flap angle threshold such as 20 degrees, which it does in this example. Accordingly, because these three factors indicate a fuel jettison event that may contaminate the aircraft's flaps, the alert module 208 generates an alert to indicate the possible flap contamination.

In some embodiments, the fuel rate module 202 compares the determined rate of decrease in the fuel quantity to a baseline rate for the same flight and aircraft 110 to determine if the changed rate is abnormal for this point in the flight (e.g., if the difference in the rates satisfies a threshold difference), which may indicate a fuel jettison event outside of a normal fuel jettison event. Furthermore, the historical baseline data may be used to verify that a detected fuel jettison event is a normal fuel jettison event for the flight, which may, however, still contaminate the aircraft's flaps.

Figure 4:
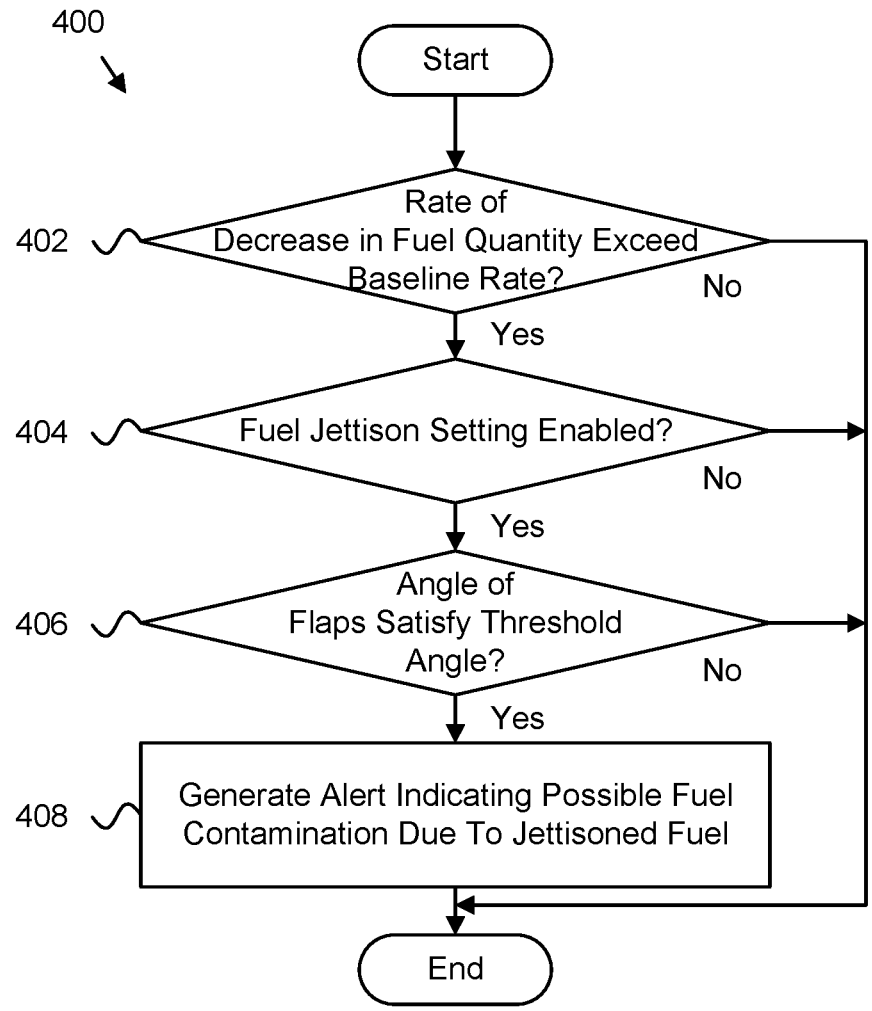
FIG. 4 is a schematic flow diagram of a method for detecting a fuel jettison event, according to one or more examples of the present disclosure.

FIG. 4 is a schematic flow-chart diagram illustrating one embodiment of a method 400 for detecting a fuel jettison event. The method 400 begins and determines 402 whether a rate of decrease in fuel quantity for an aircraft 110 exceeds a previously-determined baseline rate of decrease in fuel quantity for the aircraft 110 by a threshold rate during a corresponding segment of the aircraft's flight. If not, the method 400 ends.

Otherwise, the method 400 determines 404 whether a fuel jettison setting for the aircraft 110 is enabled in response to the detected increase in the rate of decrease in fuel quantity. If not, the method 400 ends. Otherwise, the method 400 determines 406 whether an angle of one or more flaps of the aircraft 110 satisfies a threshold angle. If not, the method 400 ends. Otherwise, the method 400 generates 408 an alert indicating possible fuel contamination of the one or more flaps due to jettisoned fuel, and the method 400 ends. In one embodiment, the fuel rate module 202, the jettison module 204, the flap module 206, and the alert module 208 perform the various steps of the method 400.

Figure 5:
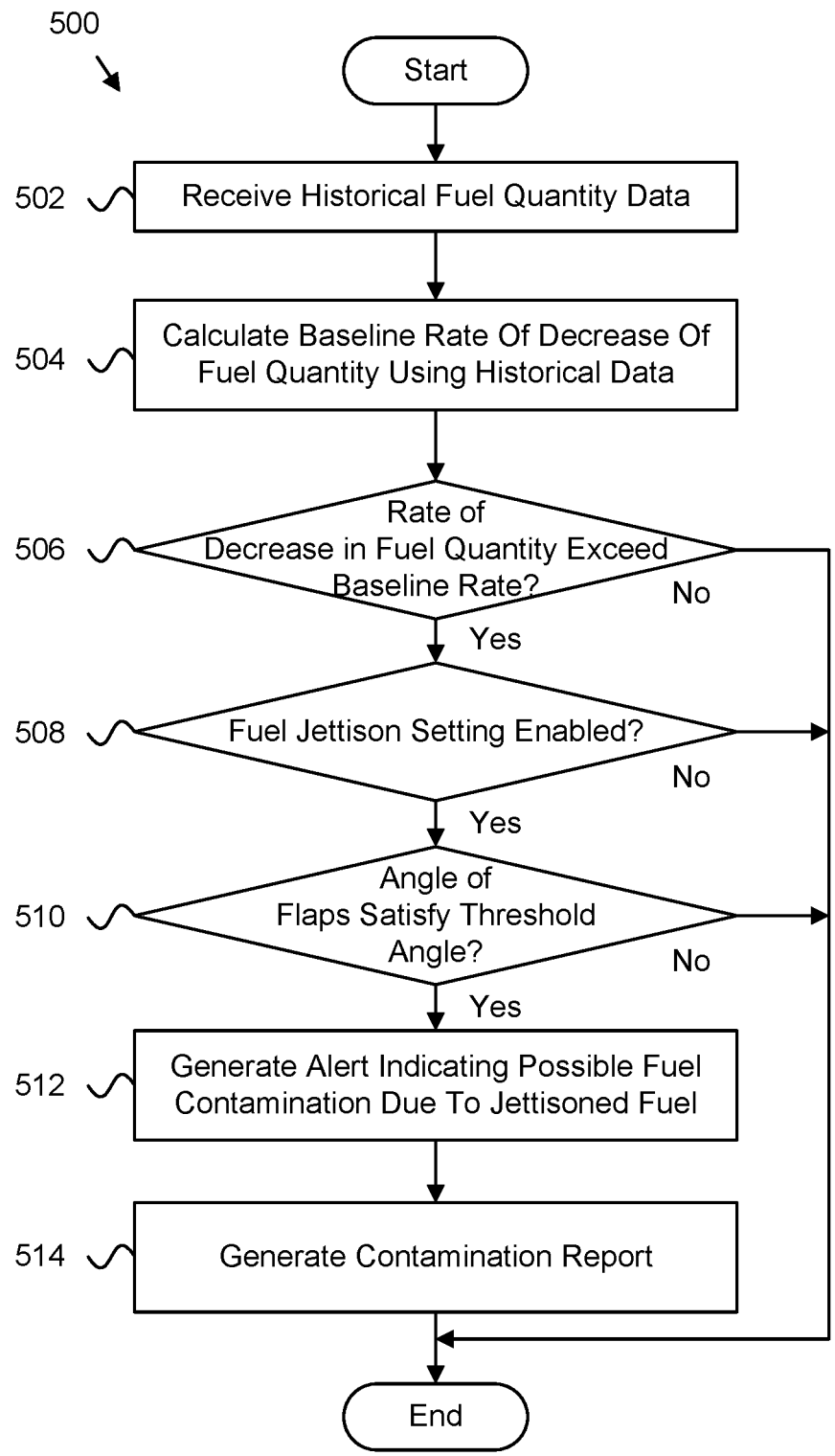
FIG. 5 is a schematic flow diagram of a method for detecting a fuel jettison event, according to one or more examples of the present disclosure.

FIG. 5 is a schematic flow-chart diagram illustrating one embodiment of a method 500 for detecting a fuel jettison event. The method 500 begins and receives 502 historical fuel quantity data associated with the current aircraft 110 and flight. The method 500 calculates 504 the baseline rate of decrease of fuel quantity using the historical fuel quantity data. For instance, the baseline module 210 may generate a curve of the historical fuel quantity data, take the first derivative of the curve to generate a second curve of the slope of the historical fuel quantity data, and then take the second derivative of the second curve to determine the rate of decrease in the fuel quantity for the aircraft 110 over the course of the aircraft's flight.

In further embodiments, the method 500 determines 506 whether a rate of decrease in fuel quantity for an aircraft 110 exceeds a previously-determined baseline rate of decrease in fuel quantity for the aircraft 110 by a threshold rate, based on the previously calculated baseline rate, during a corresponding segment of the aircraft's flight. If not, the method 500 ends.

Otherwise, the method 500 determines 508 whether a fuel jettison setting for the aircraft 110 is enabled in response to the detected increase in the rate of decrease in fuel quantity. If not, the method 500 ends. Otherwise, the method 500 determines 510 whether an angle of one or more flaps of the aircraft 110 satisfies a threshold angle. If not, the method 500 ends. Otherwise, the method 500 generates 512 an alert indicating possible fuel contamination of the one or more flaps due to jettisoned fuel. The method 500 also generates 514 a contamination report that provides information to ground and maintenance crews of the possible fuel contamination of the flaps due to the jettisoned fuel, and the method 500 ends. In one embodiment, the fuel rate module 202, the jettison module 204, the flap module 206, the alert module 208, the baseline module 210, and the report module 212 perform the various steps of the method 500.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over.

Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method.

Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method, comprising:
    detecting that a rate of decrease in fuel quantity for an aircraft exceeds a previously-determined baseline rate of decrease in fuel quantity for the aircraft by a threshold rate during a corresponding segment of flight of the aircraft;
    determining that a fuel jettison setting for the aircraft is enabled in response to a detected increase in the rate of decrease in fuel quantity;
    determining that an angle of one or more flaps of the aircraft satisfies a threshold angle; and
    generating an alert indicating possible fuel contamination of the one or more flaps due to jettisoned fuel.

2. The method according to claim 1, further comprising determining the baseline rate of decrease in fuel quantity based on historical fuel quantity data associated with the aircraft and flight of the aircraft.

3. The method according to claim 2, further comprising:
    tracking a real-time fuel quantity for the aircraft over time during flight of the aircraft;
    calculating a slope of a first curve for the fuel quantity for the aircraft and the rate of decrease in the fuel quantity for the aircraft based on the calculated slope of the first curve;
    calculating a slope of a second curve for the historical fuel quantity data and the baseline rate of decrease in fuel quantity for the aircraft based on the calculated slope of the second curve; and
    comparing the calculated rate of decrease in the fuel quantity for the aircraft to the determined baseline rate of decrease in fuel quantity for the historical data to determine whether a difference in the rates of decrease in the fuel quantities satisfies the threshold rate.

4. The method according to claim 3, further comprising:
    detecting a change in the slope of the first curve for the fuel quantity of the aircraft that satisfies a slope change threshold;
    in response to the slope of the first curve satisfying the slope change threshold, periodically calculating the slope of the first curve at different intervals until the slope of the first curve is substantially similar to the slope of the first curve prior to the detected change in the slope; and averaging the slope of the first curve for the different intervals, the average slope indicating the rate of decrease in the fuel quantity for the aircraft.

5. The method according to claim 4, further comprising ignoring the detected change in the fuel quantity of the aircraft in response to the detected change in the slope of the first curve for the fuel quantity of the aircraft not satisfying the slope change threshold.

6. The method according to claim 1, wherein the fuel jettison setting for the aircraft is an automatic fuel jettison setting such that when the automatic fuel jettison setting is enabled, fuel is automatically jettisoned from the aircraft based on one or more conditions associated with the aircraft.

7. The method according to claim 1, further comprising monitoring and tracking the angle of the one or more flaps during the aircraft's flight.

8. The method according to claim 1, further comprising generating a report in response to the alert that includes information related to the possible fuel contamination of the one or more flaps, the report comprising one or more of an amount of fuel that may have contaminated the one or more flaps, the angle that the one or more flaps were set, an altitude of the aircraft when the fuel may have contaminated the flaps, a speed of the aircraft when the fuel may have contaminated the flaps, and an estimated amount of time that the fuel may have contaminated the flaps.

9. The method according to claim 1, wherein the threshold angle for the one or more flaps is at least 20 degrees.

10. The method according to claim 9, wherein the threshold angle for the one or more flaps is at least 30 degrees.

11. An apparatus, comprising:
a processor; and
a memory that stores code executable by the processor to:
detect that a rate of decrease in fuel quantity for an aircraft exceeds a previously-determined baseline rate of decrease in fuel quantity for the aircraft by a threshold rate during a corresponding segment of flight of the aircraft;
determine that a fuel jettison setting for the aircraft is enabled in response to a detected increase in the rate of decrease in fuel quantity;
determine that an angle of one or more flaps of the aircraft satisfies a threshold angle; and
generate an alert indicating possible fuel contamination of the one or more flaps due to jettisoned fuel.

12. The apparatus according to claim 11, wherein the code is further executable by the processor to determine the baseline rate of decrease in fuel quantity based on historical fuel quantity data associated with the aircraft and flight of the aircraft.

13. The apparatus according to claim 12, wherein the code is further executable by the processor to:
track a real-time fuel quantity for the aircraft over time during flight of the aircraft;
calculate a slope of a first curve for the fuel quantity for the aircraft and the rate of decrease in the fuel quantity for the aircraft based on the calculated slope of the first curve;
calculate a slope of a second curve for the historical fuel quantity data and the baseline rate of decrease in fuel quantity for the aircraft based on the calculated slope of the second curve; and compare the calculated rate of decrease in the fuel quantity for the aircraft to the determined baseline rate of decrease in fuel quantity for the historical data to determine whether a difference in the rates of decrease in the fuel quantities satisfies the threshold rate.

14. The apparatus according to claim 13, wherein the code is further executable by the processor to:
detect a change in the slope of the first curve for the fuel quantity of the aircraft that satisfies a slope change threshold;
in response to the slope of the first curve satisfying the slope change threshold, periodically calculate the slope of the first curve at different intervals until the slope of the first curve is substantially similar to the slope of the first curve prior to the detected change in the slope; and
average the slope of the first curve for the different intervals, the average slope indicating the rate of decrease in the fuel quantity for the aircraft.

15. The apparatus according to claim 14, wherein the code is further executable by the processor to ignore the detected change in the fuel quantity of the aircraft in response to the detected change in the slope of the first curve for the fuel quantity of the aircraft not satisfying the slope change threshold.

16. The apparatus according to claim 11, wherein the fuel jettison setting for the aircraft is an automatic fuel jettison setting such that when the automatic fuel jettison setting is enabled, fuel is automatically jettisoned from the aircraft based on one or more conditions associated with the aircraft.

17. The apparatus according to claim 11, wherein the code is further executable by the processor to monitor and track the angle of the one or more flaps during the flight of the aircraft.

18. The apparatus according to claim 11, wherein the code is further executable by the processor to generate a report in response to the alert that includes information related to the possible fuel contamination of the one or more flaps, the report comprising one or more of an amount of fuel that may have contaminated the one or more flaps, the angle that the one or more flaps were set, an altitude of the aircraft when the fuel may have contaminated the flaps, a speed of the aircraft when the fuel may have contaminated the flaps, and an estimated amount of time that the fuel may have contaminated the flaps.

19. The apparatus according to claim 11, wherein the threshold angle for the one or more flaps is at least 20 degrees.

20. A program product comprising a non-transitory computer readable storage medium that stores code executable by a processor, the executable code comprising code to:
detect that a rate of decrease in fuel quantity for an aircraft exceeds a previously-determined baseline rate of decrease in fuel quantity for the aircraft by a threshold rate during a corresponding segment of flight of the aircraft;
determine that a fuel jettison setting for the aircraft is enabled in response to a detected increase in the rate of decrease in fuel quantity;
determine that an angle of one or more flaps of the aircraft satisfies a threshold angle; and
generate an alert indicating possible fuel contamination of the one or more flaps due to jettisoned fuel.

* * * * *